(12) United States Patent
Harper et al.

(10) Patent No.: US 7,568,764 B2
(45) Date of Patent: Aug. 4, 2009

(54) RECLINING REAR SEAT FOR VEHICLE HAVING FOUR-BAR LINK

(75) Inventors: Kendrick Harper, Temperance, MI (US); Anton Crainic, Canton, MI (US); David Hoffman, Canton, MI (US); Jay Erickson, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/620,916

(22) Filed: Jan. 8, 2007

(65) Prior Publication Data

US 2008/0164740 A1 Jul. 10, 2008

(51) Int. Cl.
*B60N 2/36* (2006.01)
*B60N 2/30* (2006.01)
*B60N 2/20* (2006.01)

(52) U.S. Cl. .................. 297/331; 297/335; 297/14; 297/15; 297/378.13

(58) Field of Classification Search ............ 297/14, 297/15, 331, 335, 378.13
See application file for complete search history.

(56) References Cited

U.S. PATENT DOCUMENTS

| | | | |
|---|---|---|---|
| 5,112,109 A * | 5/1992 | Takada et al. ............ 297/343 |
| 5,366,196 A | 11/1994 | Mitschelen et al. | |
| 5,498,052 A * | 3/1996 | Severini et al. ........... 297/14 X |
| 5,553,920 A | 9/1996 | Meschkat et al. | |
| 5,622,406 A | 4/1997 | Meschkat et al. | |
| 5,671,948 A * | 9/1997 | Susko et al. ............ 297/335 X |
| 6,234,553 B1 * | 5/2001 | Eschelbach et al. ....... 297/15 X |
| 6,655,738 B2 | 12/2003 | Kammerer | |
| 6,742,841 B1 * | 6/2004 | Soditch et al. .............. 297/335 |
| 6,851,753 B2 | 2/2005 | Akaike et al. | |
| 6,883,854 B2 * | 4/2005 | Daniel ................ 297/335 X |
| 6,902,236 B2 * | 6/2005 | Tame .................... 297/335 |
| 6,921,058 B2 | 7/2005 | Becker et al. | |
| 6,964,452 B2 | 11/2005 | Kammerer | |
| 7,029,063 B2 * | 4/2006 | Holdampf .................. 297/15 |
| 7,213,861 B2 * | 5/2007 | Yokoyama et al. ....... 297/331 X |
| 7,270,371 B2 * | 9/2007 | Adragna et al. .............. 297/14 |
| 7,273,243 B2 * | 9/2007 | Prugarewicz ............. 297/15 X |
| 2004/0075322 A1 | 4/2004 | Jaeger et al. | |
| 2006/0131945 A1 * | 6/2006 | Tanaka et al. ............ 297/14 X |

* cited by examiner

*Primary Examiner*—Rodney B. White
(74) *Attorney, Agent, or Firm*—Shook, Hardy & Bacon L.L.P.

(57) ABSTRACT

A reclining rear seat for a motor vehicle such as a pick-up truck is provided. The rear seat utilizes a pivoting, four-bar link arrangement between the underside of the seat bottom and the vehicle floor. The seat back is slidably and releasably attached to a striker fitted to the inside back wall of the vehicle. This arrangement permits the occupant to selectively move the seat between a reclining position and a non-reclining position without compromising storage space between the front seat and the rear seat. When not in use, the seat bottom may be released and moved to a substantially vertical position against the seat back to increase cargo space. Alternatively, the seat back may be released and moved to a substantially horizontal position against the seat bottom to increase cargo space.

20 Claims, 8 Drawing Sheets

RECLINING REAR SEAT FOR VEHICLE HAVING FOUR-BAR LINK

TECHNICAL FIELD

The present invention relates generally to seats for motor vehicles. More particularly, the present invention relates to a reclining rear seat for a motor vehicle which can be adjusted horizontally or vertically to enhance cargo storage.

BACKGROUND OF THE INVENTION

In the motor vehicle industry there is a desire to increase comfort for rear-seat passengers in all types of vehicles, including pick-up trucks having extended cabs. However, increasing passenger comfort for rear-seat passengers in pick-up trucks has been challenging for the industry since the rear wall of the pick-up truck cabin inhibits the ability of the rear seat to recline. To overcome this some manufacturers provide rear seats are fixed in a forward position relative to the rear wall to allow adequate room for the seat back to recline. But this arrangement degrades the amount of cargo storage room that would otherwise be available in front of the seat. Known technology for rear seats of pick-up trucks provides either comfort by compromising storage space or storage space by compromising comfort.

Accordingly, as in so many areas of vehicle technology, there is room in the art of vehicle seat design for improving the comfort of rear seats of pick-up trucks without compromising rear passenger comfort.

SUMMARY OF THE INVENTION

The present invention provides a reclining rear seat for a motor vehicle such as a pick-up truck. The rear seat of the present invention utilizes a pivoting, four-bar link arrangement between the underside of the seat bottom and the vehicle floor. The seat back is slidably and releasably attached to strikers fitted to the inside back wall of the vehicle. This arrangement permits the occupant to selectively move the seat between a reclining position and a non-reclining position without compromising storage space between the front seat and the rear seat.

In addition to the reclining action, the present invention is configured to provide maximum cargo space behind the front seats. Specifically, when the seat is not occupied by a passenger, the front pivoting bars of the four-bar link arrangement can be released from the floor allowing the seat bottom can be raised to a substantially vertical position toward the seat back for storage. Cargo space behind the front seat can alternatively be increased when the seat back is released from the striker allowing the seat back to be folded forward to lie on the upper surface of the seat bottom in a substantially horizontal position for storage behind the front seat. The seat is retained in its different positions by way of a latch assembly.

Other advantages and features of the invention will become apparent when viewed in light of the detailed description of the preferred embodiments when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
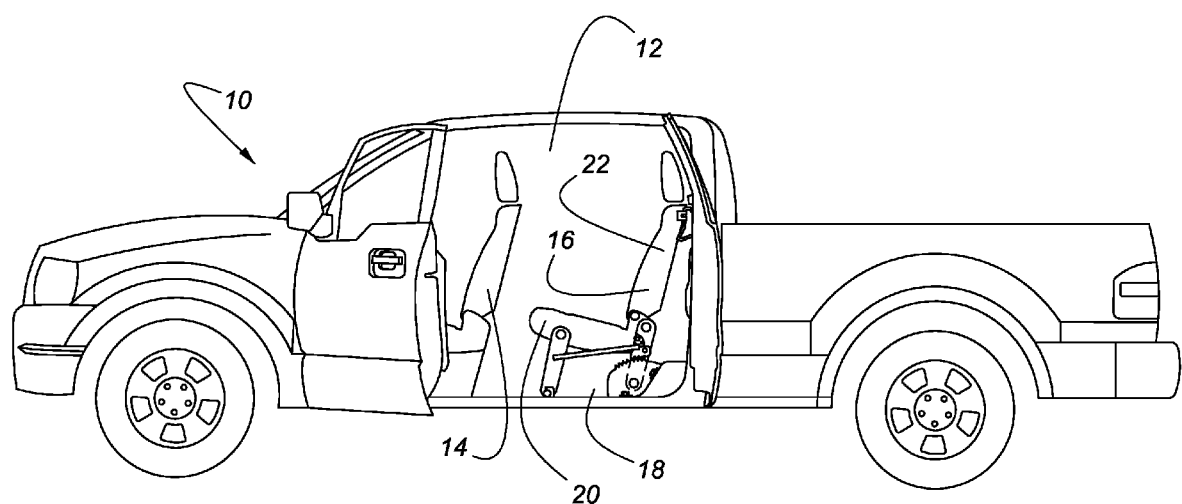
FIG. 1 shows a left side elevational view of a pick-up truck having a reclining rear seat according to the present invention.

In the following figures, the same reference numerals will be used to refer to the same components. In the following description, various operating parameters and components are described for one constructed embodiment. These specific parameters and components are included as examples and are not meant to be limiting.

With reference to FIG. 1, an extended cab pick-up truck, generally illustrated as 10, is shown. It is to be understood that while a pick-up truck is used herein to illustrate the reclining seat of the present invention, the application of the present invention is not limited to pick-up trucks. Instead, the reclining seat of the present invention may find use in the rear portion of any vehicle where interior space is restricted and rear seat comfort is desired.

The pick-up truck 10 includes a vehicle cabin 12. In the vehicle cabin is a front seat 14 and a rear seat 16. Both the front seat 14 and the rear seat 16 are mounted on a vehicle floor 18. The rear seat 16 includes a seat bottom 20 and a seat back 22. The term "seat bottom" refers to both the seat frame and the upholstery of seat bottom 20. Likewise the term "seat back" refers to both the seat frame and the upholstery of seat back 22. The seat bottom 20 and the seat back 22 are pivotably attached to one another at a pivot point 24 as is known in the art.

Figure 2:
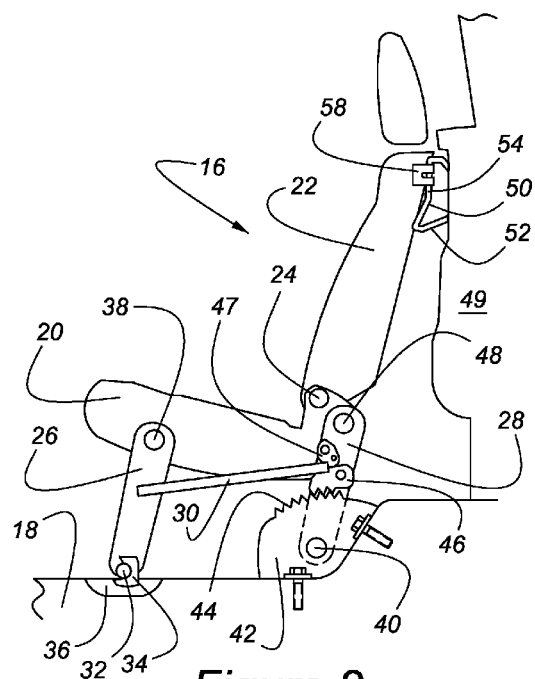
FIG. 2 is a side view illustrating a reclining rear seat of the present invention in its upright position.
Figure 3:
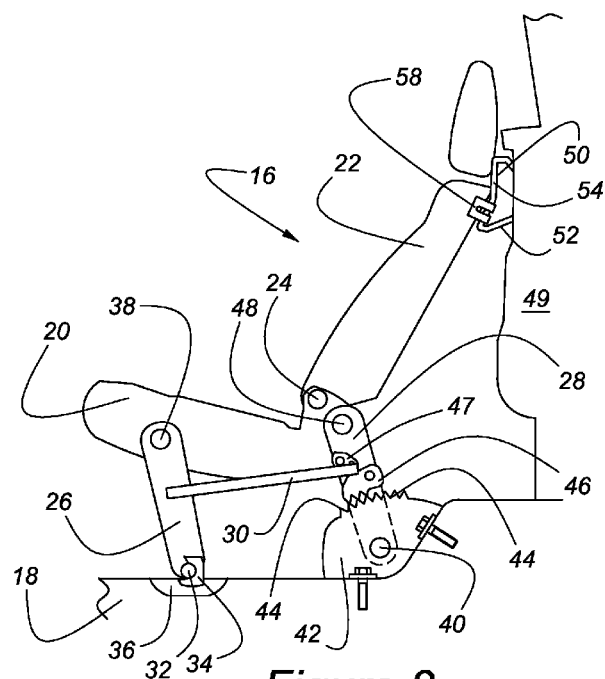
FIG. 3 is a view similar to that of FIG. 2 but illustrating the present invention in its reclining position.
Figure 4:
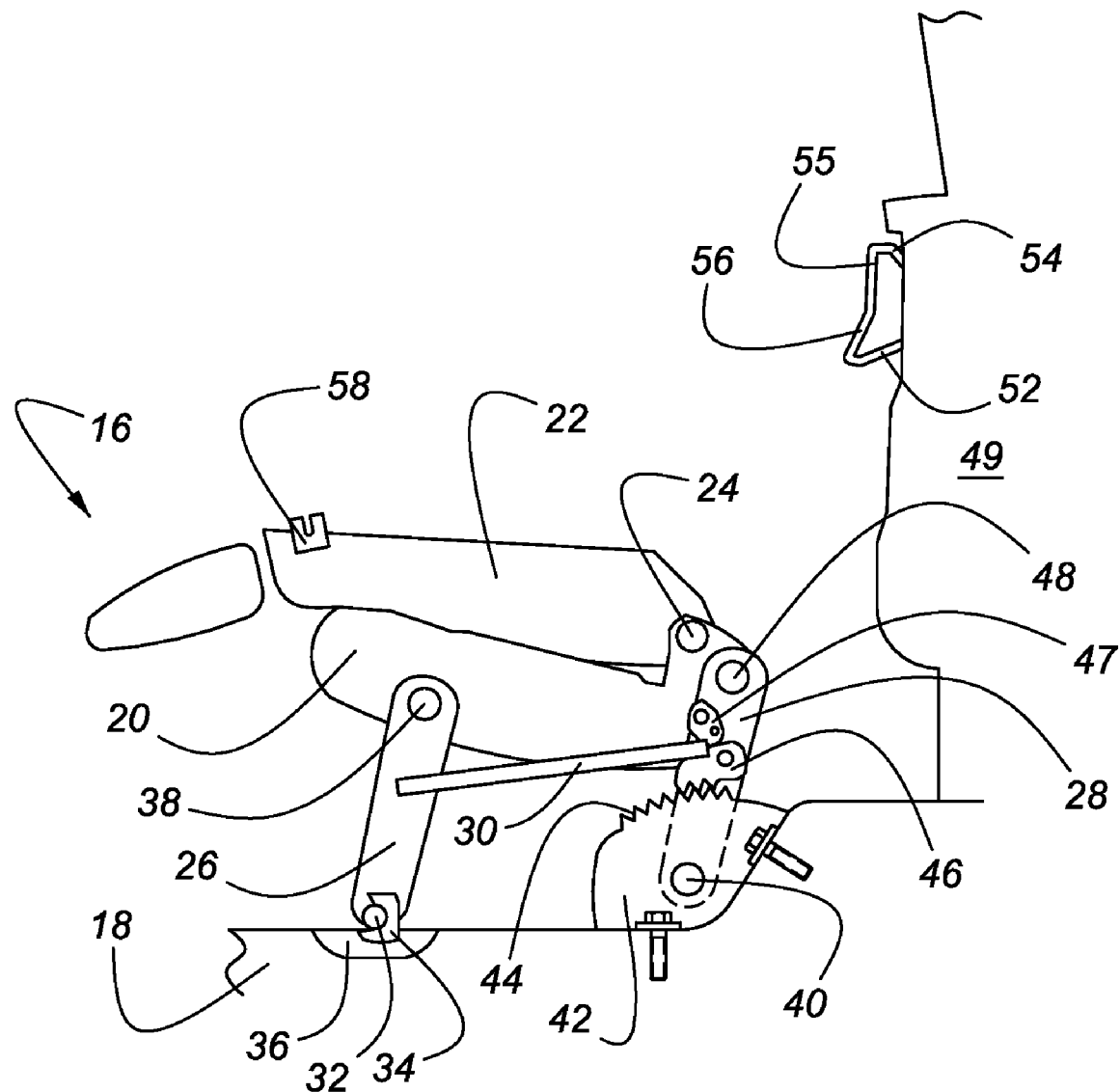
FIG. 4 is a side view illustrating the reclining rear seat of the present invention with the seat back folded forward on top of the seat bottom for increasing vehicle storage space.
Figure 5:
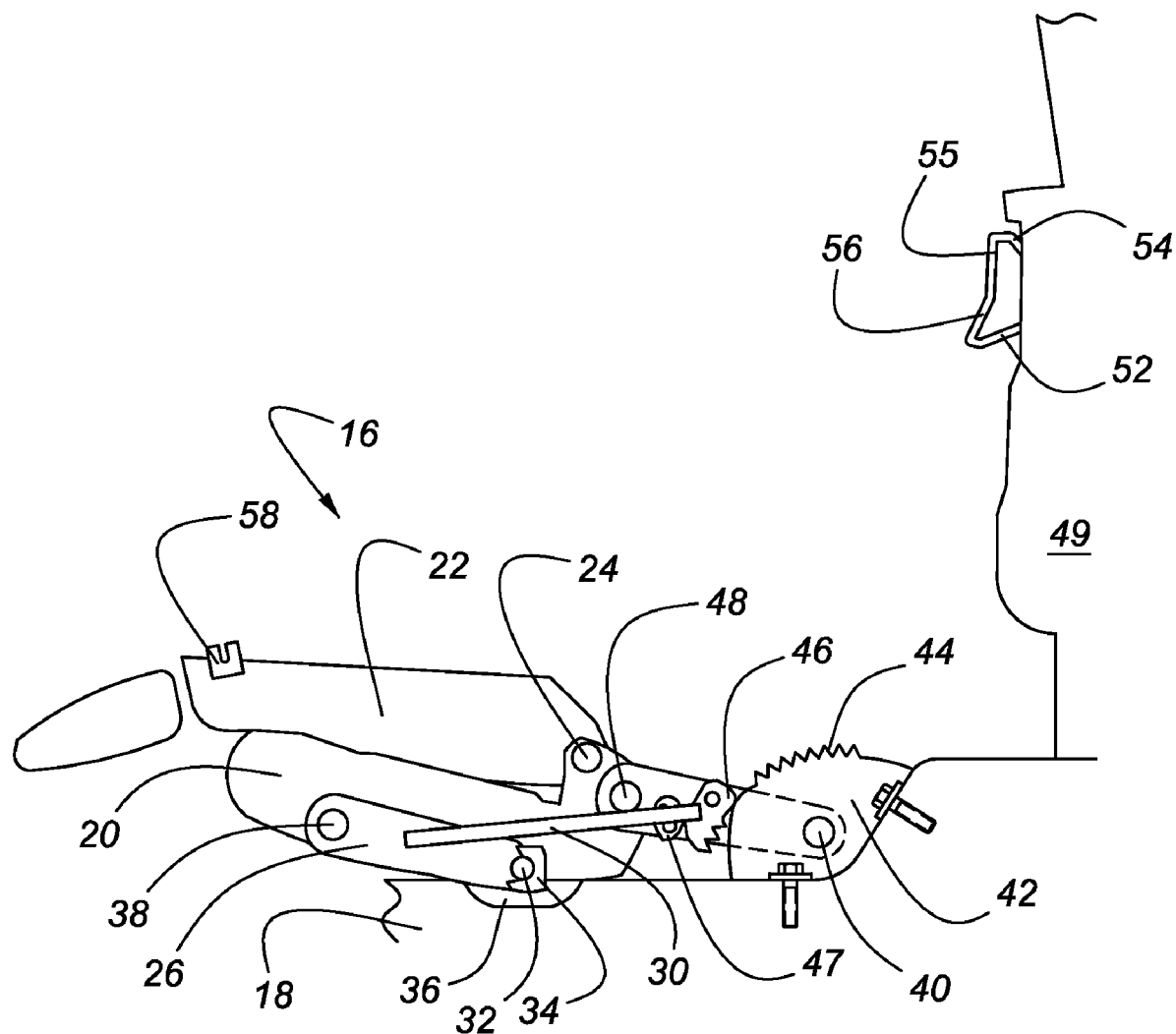
FIG. 5 is a view similar to that of FIG. 4 but illustrating the seat assembly moved to its lowered position for maximum storage.

With reference to FIG. 2 and FIG. 3, the seat 16 is shown in the two positions usable by a seat occupant. Particularly, the seat 16 is shown in its upright position in FIG. 2 and in its reclining position in FIG. 3. In FIG. 4 the seat is shown in its seat back 22 folded down against the upper side of the seat bottom 20. In this arrangement additional storage space is achieved. In FIG. 5 the seat 16 is illustrated as having been moved to its lowered position for maximum storage space.

Figure 8:
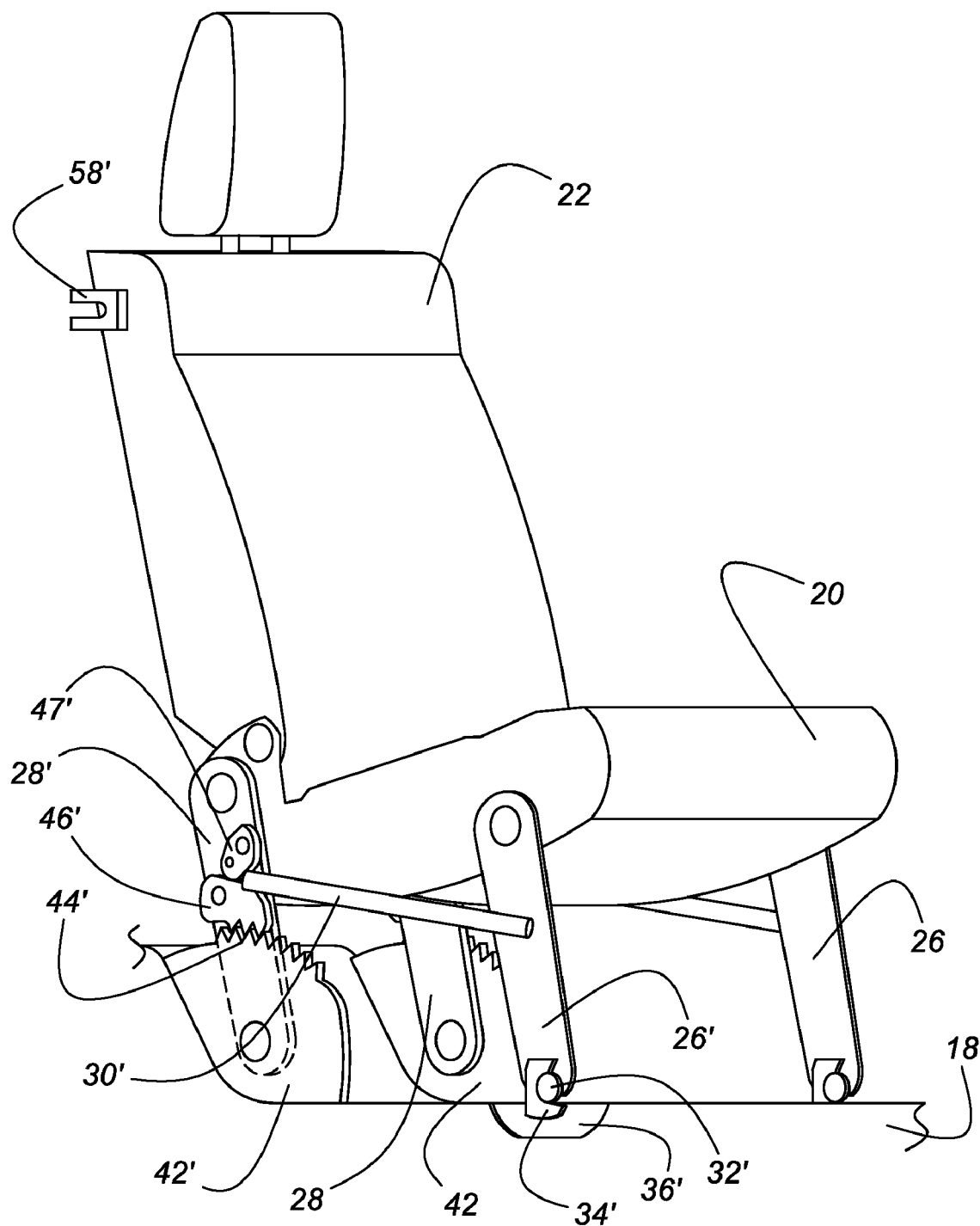
FIG. 8 is a perspective view of the reclining rear seat of the present invention in its upright position generally showing the front and right side of the seat.
Figure 9:
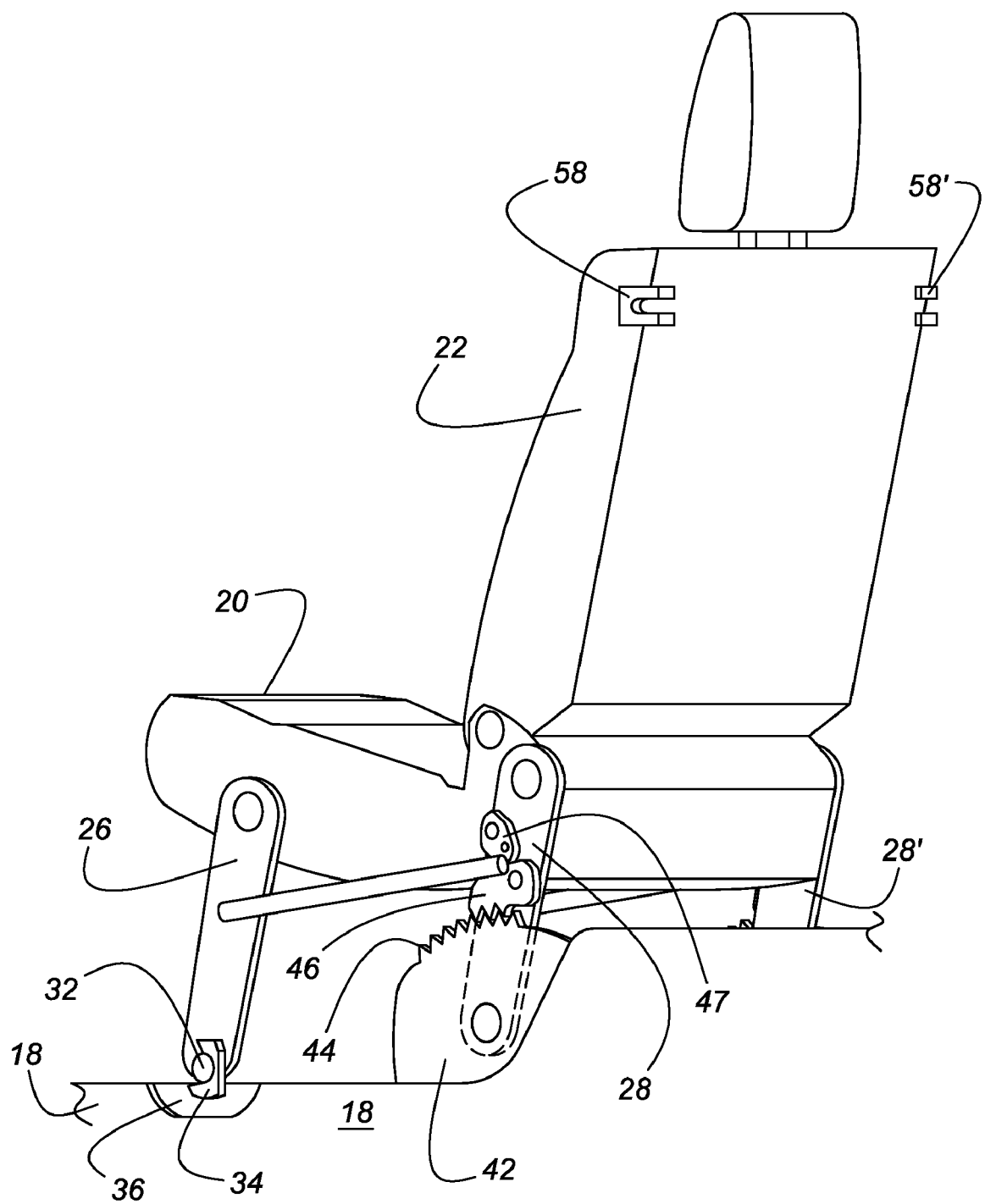
FIG. 9 is a perspective view of the reclining rear seat of the present invention in its upright position generally showing the rear and left side of the seat.

The seat bottom 20 is attached to the floor 18 by four pivotabale legs of which a front or rectractable leg 26 and a rear or non-retractable leg 28 are shown. It is to be understood that the front leg 26 is one of two front legs, the other not shown in FIG. 2 but being parallel in placement and function to the illustrated front leg 26. (The leg 26 and its parallel leg 26' are shown in FIG. 8.) It is also to be understood that the rear leg 28 is one of two rear legs, the other not shown but again being parallel to placement and function to the illustrated rear leg 28. (The leg 28 and its parallel leg 28' are shown in FIG. 9.) The legs 26, 28 are operatively connected by a retracting link 30.

The front leg 26 is pivotably attached to both the vehicle floor 18 and to the seat bottom 20. Attachment to the vehicle floor 18 is made by a first pivot point 32 defined by a pin which is releasably attached to the vehicle floor 18 by a floor latch 34—which is provided in a floor striker (tub) 36 as is known in the art. Attachment to the seat bottom 20 is made by a second pivot point 38 which is permanently fixed to the seat bottom 20.

The rear leg 28 is also pivotably attached to the both the vehicle floor 18 and to the seat bottom 20. Attachment to the vehicle floor 18 is made by a third pivot point 40 which his pivotably attached to a support plate 42. The support plate 42 is itself fixedly attached to the vehicle floor 18. The support plate 42 has formed thereon a plurality of locking teeth 44. A toothed pawl 46 is pivotabaly attached to the leg 28. The teeth of the toothed pawl 46 may selectively engage the plurality of locking teeth 44 formed on the support plate 42 as will be discussed below. An eccentric or locking cam 47 is also pivotably attached to the leg 28. The locking cam 47 is used to selectively force the engagement of the toothed pawl 46 with the locking teeth 44. A release cable (not shown) is attached to the locking cam 47 for its selective operation as is known in the art.

Attachment of the rear leg 28 to the seat bottom 20 is made by a fourth pivot point 48 which is also permanently fixed to the seat bottom 20.

While the seat bottom 20 of the rear seat 16 is pivotably attached to the floor 18 by the front leg 26 and the rear leg 28, the seat back 22 is releasably attached to the vehicle 10 as well. Specifically, the vehicle cabin 12 of the vehicle 10 includes a back wall 49. The seat back 22 is attached to the back wall 49 by a movable and releasable seat back attachment assembly 50. The assembly 50 includes a back wall-mounted striker 52 which has a contoured rod 54.

Figure 6:
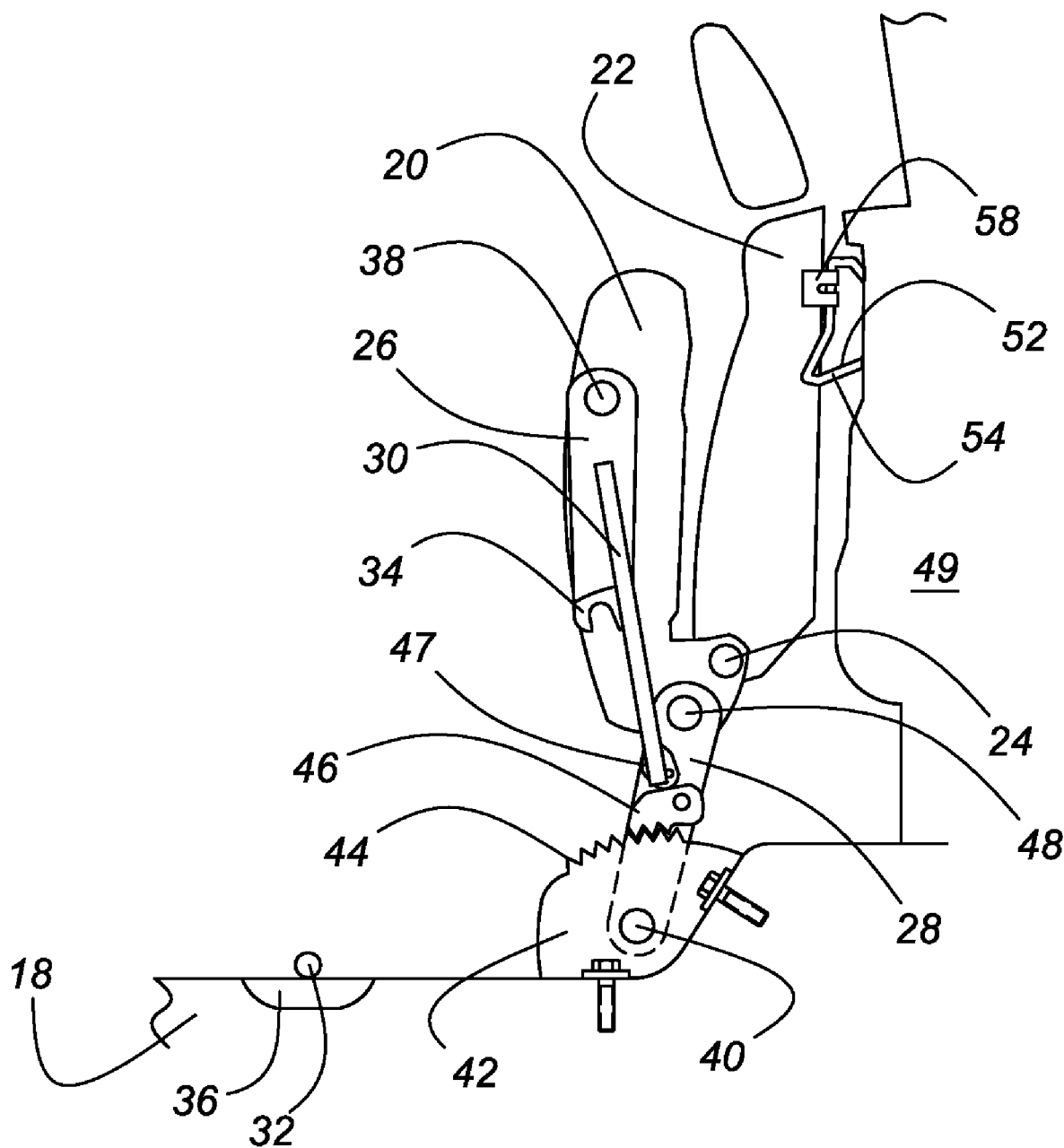
FIG. 6 is a side view illustrating the reclining rear seat of the present invention with the seat bottom folded upward on top of the seat back to illustrate an alternative approach to increasing vehicle storage space.

The rod 54 includes two position areas 55 and 56 best seen in FIGS. 4 and 5. The assembly 50 further includes a seat latch 58 mounted to the back side of the seat back 22. The seat latch 58 is releasably attachable to the contoured surface 54 of the assembly 50 as illustrated in FIGS. 2, 3 and 6. When the seat 16 is in its upright position as shown in FIG. 2, the seat latch 58 is positioned along the striker 52 to the position area 55. When the seat 16 is in its reclining position as shown in FIG. 3 the seat latch 58 is positioned along the striker to position area 56. The seat latch 58 may thus be slidably and reversibly moved between the position areas 54 and 55, that is, between the upright and reclining positions of the seat 16, without the seat latch 58 being disconnected from the striker 52.

In FIG. 2 the seat 16 is illustrated in its upright position. With reference to FIG. 3, the rear seat 16 is shown in its reclining position. To effect this position, the seat user (not shown) manipulates the toothed pawl 46 in a known manner, such as by operating a latch connected with a cable (not shown), thus allowing the seat bottom 20 to pivot forward on the legs 26, 28 and further allowing the latch 58 to slide along the contoured rod 54, also of the assembly 50. The arrangement of the present invention (including the locking teeth 44 and the toothed pawl 46) and the provides several degrees of recline between the full rearward position illustrated in FIG. 2 and the full forward position illustrated in FIG. 3. The number of degrees may or may not be limited to the approximate 14 degrees of recline between illustrated in FIG. 3 and would be dependent upon such design parameters as cabin space. Between the full rearward position illustrated in FIG. 2 and the full forward position illustrated in FIG. 3 the seat 16 may be reclined to one or several intermediate stops depending on the preference of the occupant.

The rear seat 16 of the present invention provides not only comfort to the rear seat occupant because of its ability to recline, but also may be stored in one of two ways to maximize the amount of storage available to the vehicle user. FIGS. 4 and 5 illustrate a first method of seat storage—folding down of the seat back 22 against the seat bottom 20—according to the present invention. FIG. 6 illustrates a second method of seat storage—folding up the seat bottom 20 against the seat back 22—according to the present invention. Both arrangements provide the user with expanded cargo space inside the vehicle.

With reference to FIG. 4, the rear seat 16 is shown in its initial folded down seat back position. To achieve this position, the operator releases the wall latch 58 from the back wall-mounted striker 52, thus releasing the seat back 22 from attachment to the back wall 49. The seat back 22 may then be set upon the seat bottom 20 by pivoting on the third pivot point 40. The rear seat 16 may be left in this position for additional cargo space or the cargo space may be further expanded by having the rear seat 16 "kneel" forward as illustrated in FIG. 5 to create a flag cargo floor. With reference to that figure, the seat back 22 remains at rest upon the seat bottom 20 as shown in FIG. 4. However, as illustrated in FIG. 5, the operator manipulates the toothed pawl 46 relative to the locking teeth 44 formed on the support plate 42 to effect disengagement. The rear leg 28 can then pivot forward without restrictions to its movement effected, thereby moving the rear seat 16 to the position illustrated in FIG. 5 whereby maximum cargo space is made available in the vehicle cabin 12.

As an alternative to the movement of the rear seat 16 shown in FIGS. 4 and 5 and discussed with respect thereto, the seat bottom 20 may be rotated vertically so that it rests against the seat back 22 as illustrated in FIG. 6. To achieve this position, the seat back 22 remains latched to the back wall 49 by the assembly 50. The operator manipulates the floor latch 34 so that it is released from the floor striker (tub) 36, thus disconnecting the front leg 26 from the floor 18. The toothed pawl 46 must also be disengaged from the locking teeth 44 to allow this movement. With the front leg 26 released from the floor 18, the seat bottom 20 may be pivoted to the substantially vertical position illustrated in FIG. 6. The pivoting movement of the seat bottom 20 from its horizontal position to its vertical position causes the front leg 26 to be moved to a folded and stowed position as effected by action of the retracting link 30.

Figure 7:
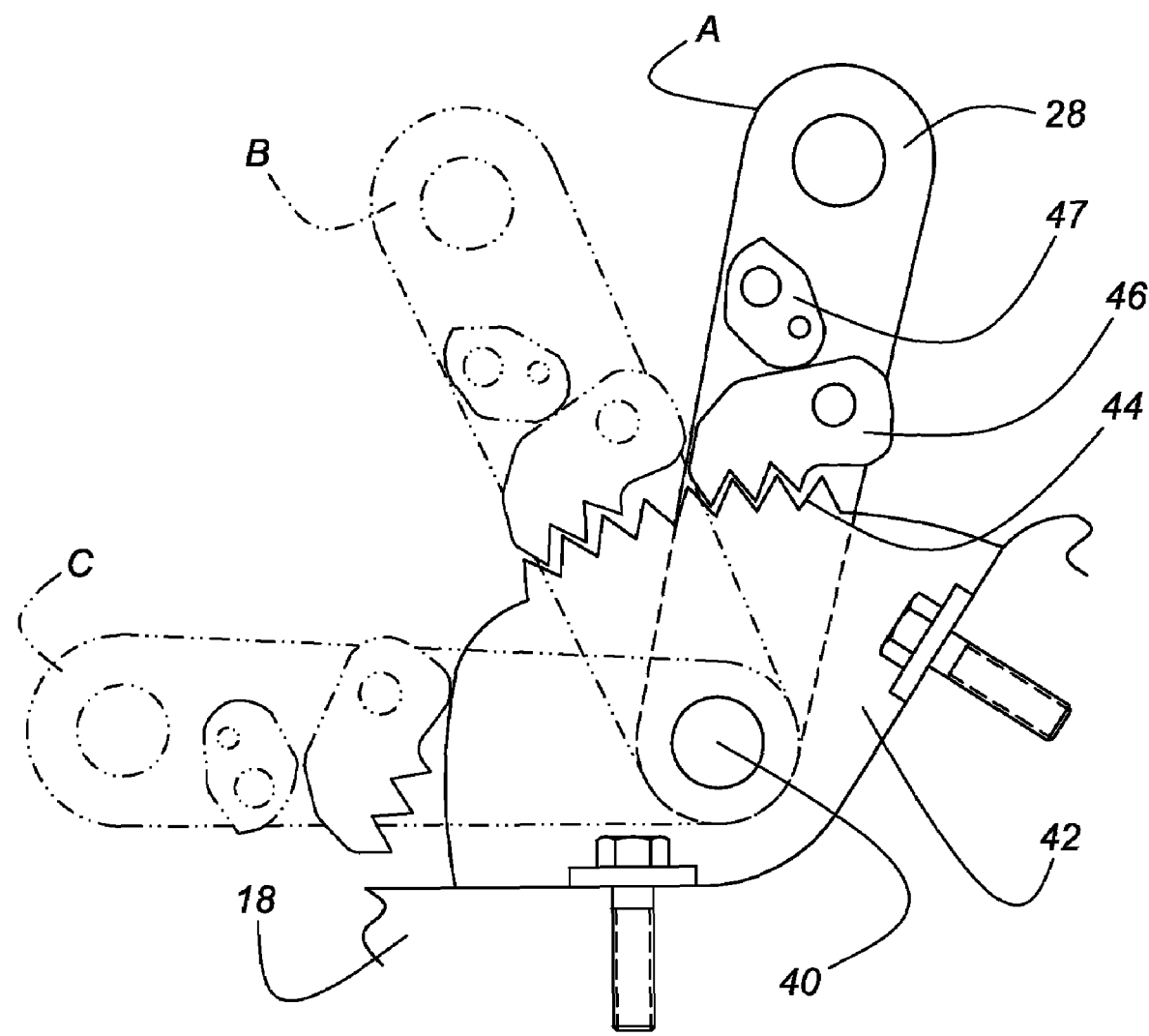
FIG. 7 is a close-up view of the locking latch assembly of the present invention illustrating the latch in its three positions.

To achieve the various positions of the seat 16 of the present invention the toothed pawl 46 must be selectively engaged with the locking teeth 44 formed on the support plate 42. The various positions of the toothed pawl 46 relative to the locking teeth 44 are illustrated in FIG. 7 which is a close-up view of the locking latch support plate 42, the rear leg 28, the toothed pawl 46, and the locking cam 47.

In position "A" (illustrated in solid lines) the seat 16 is in its upright position (shown in FIG. 2) or is in the folded positions illustrated in FIGS. 4 and 6. In this position the toothed pawl 46 is engaged with the locking teeth 44 of the support plate 42. The locking cam 47 is positioned in its locking position to maintain the position of the toothed pawl 46 relative to the locking teeth 44. Without engagement by the locking cam 47, the toothed pawl 46 would pivot to its disengaged position (as shown in position "C"), urged by a resilient member (not shown) such as a spring. However, in position "A" the locking cam 47 has been moved to its pawl-locking position whereby the toothed pawl 46 engages the locking teeth 44 of the support plate 42.

In position "B" (illustrated in broken lines) the seat 16 is in its reclining position shown in FIG. 3. In this position the tooth pawl 46 is also engaged with the locking teeth 44 of the support plate 42 as in position "A", but at a different position with respect to the locking teeth 44. The locking cam 47 is also positioned in its locking position to maintain the position of the toothed pawl relative to the locking teeth 44.

In position "C" (also illustrated in broken lines) the seat 16 is in its kneeling position illustrated in FIG. 5. In this position the locking cam 47 has been moved by an operator to its unlocked position, thus allowing the toothed pawl 46 to pivot away from engagement with the locking teeth 44.

With respect to FIG. 8, a perspective view of the reclining rear seat 16 of the present invention in its upright position is shown. This view generally shows the front and right side of the rear seat 16. According to this view, both rectractable legs 26, 26' are readily visible as are both of the rear legs 28, 28'. The rectractable leg 26' is selectively attached to the floor 18 by a first pivot point 32' which, like the pivot point 32, is defined by a pin which is releasably attached to the vehicle floor 18 by a floor latch 34'. The legs 26', 28' are connected by a retracting link 30'. The floor latch 34' is provided in a floor striker (tub) 36'.

The rear leg 28' is connected to the vehicle floor 18 by a support plate 42' which has a plurality of locking teeth 44' formed thereon. Pivotably attached to the leg 28' is a toothed pawl 46'. As described above with respect to the support plate 42, the locking teeth 44, and the toothed pawl 46, the teeth of the toothed pawl 46' may selectively engage the plurality of locking teeth 44'. Also pivotably attached to the leg 28' is a locking cam 47' which, as in the case of the locking cam 47 described above, is used to selectively maintain engagement of the toothed pawl 46' with the locking teeth 44'.

A perspective view of the reclining rear seat 20 of the present invention in its upright position generally showing the rear and left side of the seat is shown in FIG. 9. By this view a seat latch 58' may be clearly seen in its relation to the seat back 22 and to the seat latch 58. It is to be understood that while a pair of spaced apart seat latches 58, 58' is shown a single latch may alternatively be used or a greater number of latches may as well be alternatively used. In addition, the seat latch may be of an alternate configuration from that shown in FIG. 9 so long as the dual characteristics of movability along the contoured rod 54 of the striker 52 and releasability from the striker 52 are maintained.

The foregoing discussion discloses and describes a exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A reclining seat for a vehicle, the vehicle having a floor and a back wall, the seat comprising:
    a seat base having a front and a rear;
    a seat back pivotably associated with said seat base;
    at least one rear leg for pivotably connecting said seat base to the vehicle floor through fixed pivots thereby allowing said seat base to be raised and lowered;
    at least one front leg for releasably connecting said seat base to the vehicle floor, said at least one front leg being connected to said seat base at a first pivot point;
    a seat back latch assembly for connecting said seat back to the back wall of the vehicle; and
    a retracting link operatively connecting said at least one rear leg and said at least one front leg, said retracting link being connected with said at least one front leg at a point other than at said first pivot point, whereby upon release of said front leg from the vehicle floor said retracting link regulates the movement of said front leg.

2. The reclining seat for a vehicle of claim 1 wherein said rear seat back latch assembly comprises a latch and a rod.

3. The reclining seat for a vehicle of claim 2 wherein said latch is fitted to said seat back and said rod is adapted for fitting to the back wall of the vehicle.

4. The reclining seat for a vehicle of claim 1 wherein said rod includes a first area and a second area.

5. The reclining seat for a vehicle of claim 1 wherein said rear pair of legs are adapted for attachment to the vehicle floor by a sector assembly.

6. The reclining seat for a vehicle of claim 5 wherein said sector assembly includes a plate having a sector, said plate being adapted for fixation to the vehicle floor.

7. The reclining seat for a vehicle of claim 6 wherein said sector assembly further includes a pawl pivotably mounted to said plate, said pawl being selectively engageable with said sector of said plate.

8. The reclining seat for a vehicle of claim 7 wherein said sector assembly further includes a locking cam pivotably mounted to said plate, said locking cam being moveable between a pawl engaging position and a pawl disengaging position.

9. The reclining seat for a vehicle of claim 1 further including a connector to pivotably connect at least one of said pair of front legs to at least one of said pair of said rear legs.

10. The reclining seat for a vehicle of claim 1 further including a floor latch assembly adapted for releasably connecting said front pair of legs to the vehicle floor.

11. The reclining seat for a vehicle of claim 10 wherein a well is formed in the vehicle floor and said floor latch is adapted for fitting to the well.

12. A reclining seat for a vehicle, the vehicle having a floor and a back wall, the seat comprising:
    a seat base adapted for pivotable attachment pivotably to the vehicle floor;
    a seat back adapted for pivotable attachment to said seat base and adapted for movable attachment to the back wall;
    at least one rear leg and at least one front leg adapted for pivotable mounting between the vehicle floor and said seat base, each of said at least one rear leg and at least one front leg being movable between a seat upright position and a seat reclining position, said at least one front leg being attached to said seat base at a first pivot point;
    a seat back latch assembly connecting said seat back to the back wall of the vehicle, said connector assembly including a bracket and a latch, said latch being movable on said bracket between a seat upright position and a seat reclining position; and
    a retracting link operatively connecting said at least one rear leg and said at least one front leg, said retracting link being connected with said at least one front leg at a point other than at said first pivot point, whereby upon release of said front leg from the vehicle floor said retracting link regulates the movement of said front leg.

13. The reclining seat of claim 12 further including a floor latch assembly for attachably connecting said at least one front leg to the vehicle floor.

14. The reclining seat for a vehicle of claim 12 wherein said rear seat back latch assembly comprises a latch and a rod.

15. The reclining seat for a vehicle of claim 14 wherein said latch is fitted to said seat back and said rod is adapted for fitting to the back wall of the vehicle.

16. The reclining seat for a vehicle of claim 12 further including a floor latch assembly adapted for releasably connecting said front pair of legs to the vehicle floor.

17. A reclining seat for a vehicle, the vehicle having a floor and a back wall, the seat comprising:
   a seat base for pivotable attachment to the vehicle floor;
   a front leg for fitting between said seat base and the vehicle floor, said front leg being selectively detachable from the vehicle floor and being attached to said seat base at a first pivot point;
   a seat back for pivotable attachment to said seat base and for releasable attachment to the back wall; and
   a retracting link operatively connected to said front leg, said retracting link being connected with said front leg at a point other than at said first pivot point, whereby upon release of said front leg from the vehicle floor said retracting link regulates the movement of said front leg, wherein the vehicle seat is selectively and reversibly movable between a first position in which said front leg is detached from the vehicle floor and said seat back is attached to the back wall, a second position in which said front leg is attached to the vehicle floor and said seat back is attached to the back wall, and a third position in which said front leg is attached to the vehicle floor and said seat back is detached from the back wall.

18. The reclining seat for a vehicle of claim 17 further including a seat back assembly, said connector assembly including a bracket and a latch, said latch being movable on said bracket between a seat upright position and a seat reclining position.

19. The reclining seat for a vehicle of claim 18 wherein said bracket is a rod having a first area in which said bracket is located when said latch is in its seat upright position and a second area in which said bracket is located when said latch is in its seat reclining position.

20. The reclining seat for a vehicle of claim 19 wherein said rod is adapted for attachment to the back wall and said latch is attached to said seat back.

* * * * *